US010977183B2

(12) United States Patent
Williams et al.

(10) Patent No.: US 10,977,183 B2
(45) Date of Patent: Apr. 13, 2021

(54) PROCESSING A SEQUENCE OF TRANSLATION ENTRY INVALIDATION REQUESTS WITH REGARD TO DRAINING A PROCESSOR CORE

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/216,705

(22) Filed: Dec. 11, 2018

(65) Prior Publication Data
US 2020/0183853 A1    Jun. 11, 2020

(51) Int. Cl.
*G06F 12/00*  (2006.01)
*G06F 12/10*  (2016.01)
*G06F 9/50*  (2006.01)

(52) U.S. Cl.
CPC ............ *G06F 12/10* (2013.01); *G06F 9/5016* (2013.01); *G06F 2212/1041* (2013.01); *G06F 2212/657* (2013.01)

(58) Field of Classification Search
CPC .................. G06F 12/10; G06F 9/5016; G06F 2212/1041; G06F 2212/657

(Continued)

(56) References Cited

U.S. PATENT DOCUMENTS 5,437,017 A   7/1995  Moore et al.
5,664,159 A   9/1997  Richter et al.
(Continued)

FOREIGN PATENT DOCUMENTS

EP    3422192 A1 *  1/2019  ......... G06F 12/0873

OTHER PUBLICATIONS

Villavieja et al., Didi: "Mitigating The Performance Impact of TLB Shootdowns Using A Shared TLB Directory," 2011, IEEE Computing Society, 2011 International Conference on Parallel Architectures and Compilation Techniques, p. 347.
(Continued)

*Primary Examiner* — Mardochee Chery
(74) *Attorney, Agent, or Firm* — David Quinn; Brian F. Russell

(57) ABSTRACT

A multiprocessor data processing system includes a processor core having a translation structure for buffering a plurality of translation entries. The processor core receives a sequence of a plurality of translation invalidation requests. In response to receipt of each of the plurality of translation invalidation requests, the processor core determines that each of the plurality of translation invalidation requests indicates that it does not require draining of memory referent instructions for which address translation has been performed by reference to a respective one of a plurality of translation entries to be invalidated. Based on the determination, the processor core invalidates the plurality of translation entries in the translation structure without regard to draining from the processor core of memory access requests for which address translation was performed by reference to the plurality of translation entries.

19 Claims, 11 Drawing Sheets

(58) Field of Classification Search
USPC .......................................................... 711/206
See application file for complete search history.

(56) References Cited

U.S. PATENT DOCUMENTS

| | | | |
|---|---|---|---|
| 6,105,113 | A | 8/2000 | Schimmel |
| 6,119,204 | A | 9/2000 | Chang et al. |
| 6,128,705 | A | 10/2000 | Arimilli et al. |
| 6,158,047 | A * | 12/2000 | Le .............................. G06F 8/52 |
| | | | 717/153 |
| 6,171,714 | B1 | 1/2001 | Bergkessel et al. |
| 6,178,485 | B1 | 1/2001 | Arimilli et al. |
| 6,202,131 | B1 | 3/2001 | Arimilli et al. |
| 6,314,495 | B1 | 11/2001 | Arimilli et al. |
| 6,442,629 | B1 | 8/2002 | Arimilli et al. |
| 6,460,100 | B1 | 10/2002 | Arimilli et al. |
| 6,460,101 | B1 | 10/2002 | Arimilli et al. |
| 6,480,915 | B1 | 11/2002 | Arimilli et al. |
| 6,507,880 | B1 | 1/2003 | Arimilli et al. |
| 6,553,442 | B1 | 4/2003 | Arimilli et al. |
| 6,633,967 | B1 | 10/2003 | Duncan |
| 6,516,368 | B1 | 12/2003 | Arimilli et al. |
| 6,779,085 | B2 | 8/2004 | Chauvel |
| 6,839,813 | B2 | 1/2005 | Chauvel |
| 7,073,043 | B2 | 7/2006 | Arimilli et al. |
| 7,617,378 | B2 | 11/2009 | Arimilli et al. |
| 8,694,712 | B2 | 4/2014 | Sheu et al. |
| 8,751,752 | B2 | 6/2014 | Cota-Robles et al. |
| 9,575,815 | B1 | 2/2017 | Guthrie et al. |
| 9,710,394 | B2 | 7/2017 | Guthrie et al. |
| 9,715,459 | B2 | 7/2017 | Guthrie et al. |
| 9,772,945 | B1 | 9/2017 | Frey et al. |
| 9,785,557 | B1 | 10/2017 | Frey et al. |
| 2002/0087614 | A1 * | 7/2002 | Kocev .................. G06F 13/4081 |
| | | | 718/104 |
| 2004/0215897 | A1 | 10/2004 | Arimilli et al. |
| 2004/0215898 | A1 * | 10/2004 | Arimilli .............. G06F 12/1027 |
| | | | 711/144 |
| 2005/0080937 | A1 | 4/2005 | Cota-Robles et al. |
| 2005/0182912 | A1 | 8/2005 | DeMent et al. |
| 2007/0061547 | A1 | 3/2007 | Jordan et al. |
| 2008/0320230 | A1 | 12/2008 | Vishin et al. |
| 2008/0320231 | A1 | 12/2008 | Kinter et al. |
| 2012/0203984 | A1 | 8/2012 | Woffinden |
| 2013/0339656 | A1 | 12/2013 | Greiner et al. |
| 2016/0140051 | A1 | 5/2016 | Kessler et al. |
| 2017/0177493 | A1 * | 6/2017 | Guthrie .............. G06F 12/1027 |

OTHER PUBLICATIONS

Appendix P

Teller et al., "TLB Consistency on Highly-Parallel Shared-Memory Multiprocessors", Ultracomputer Research Laboratory Courant Institute of Mathematical Sciences. Oct. 1987.

IBM, "Synchronization of TLB Invalidate Broadcasts using a TLBSYNC Command", IP.com Prior Art Database Technical Disclosure. May 1, 1994.

IBM, "Use of the SYNC Instruction to Synchronize Completion of Translation Look-aside Buffer Invalidate in a Multi-Processor System". May 1, 1994.

Teller et al., "Translation-Lookaside Buffer Consistency", Downloaded on Apr. 24, 2009 at 04:01 from IEEE Xplore.

* cited by examiner

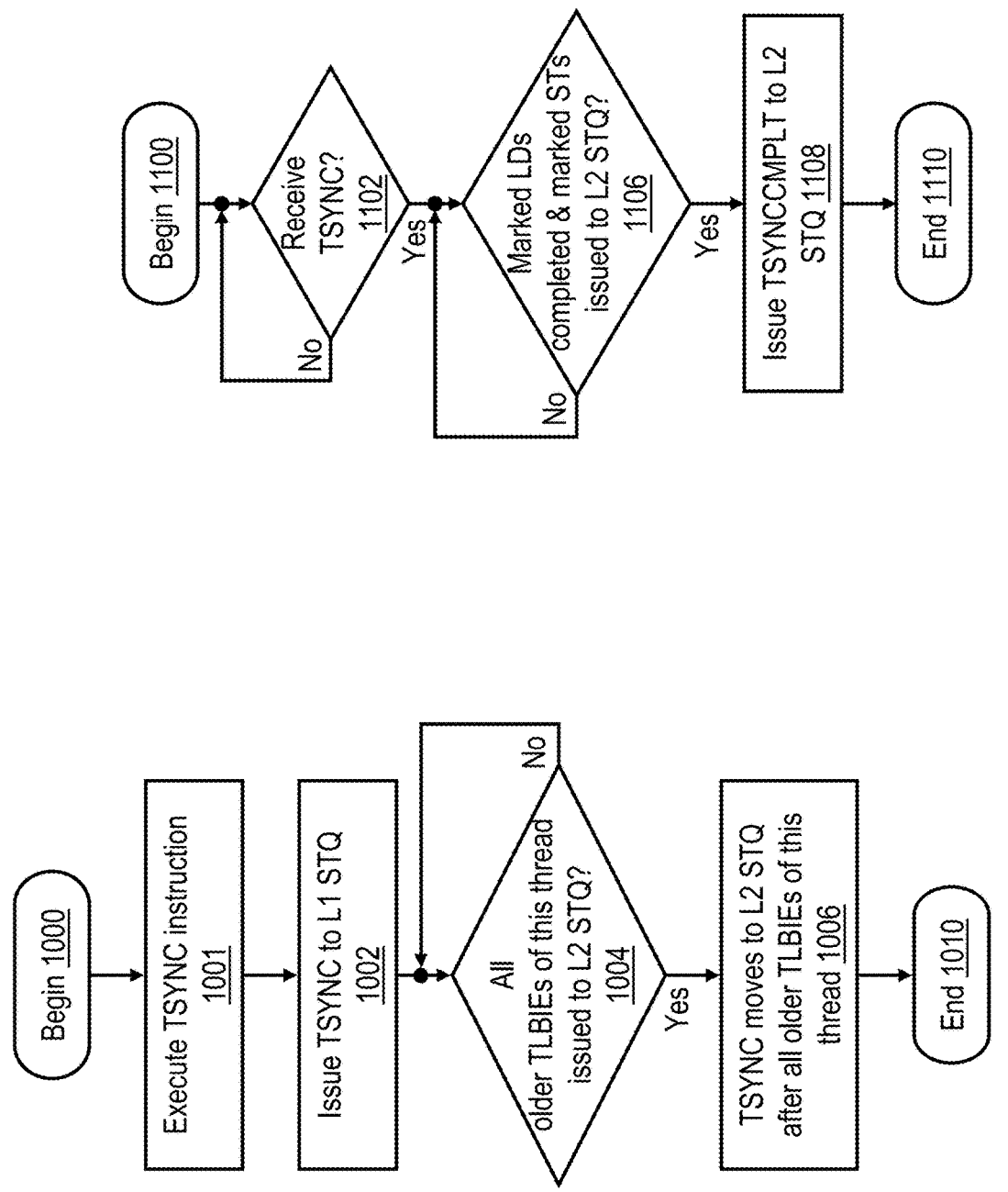

PROCESSING A SEQUENCE OF TRANSLATION ENTRY INVALIDATION REQUESTS WITH REGARD TO DRAINING A PROCESSOR CORE

BACKGROUND OF THE INVENTION

The present invention relates generally to data processing and, in particular, to translation entry invalidation in a multithreaded data processing system.

A conventional multiprocessor (MP) computer system comprises multiple processing units (which can each include one or more processor cores and their various cache memories), input/output (I/O) devices, and data storage, which can include both system memory (which can be volatile or nonvolatile) and nonvolatile mass storage. In order to provide enough addresses for memory-mapped I/O operations and the data and instructions utilized by operating system and application software, MP computer systems typically reference an effective address space that includes a much larger number of effective addresses than the number of physical storage locations in the memory mapped I/O devices and system memory. Therefore, to perform memory-mapped I/O or to access system memory, a processor core within a computer system that utilizes effective addressing is required to translate an effective address into a real address assigned to a particular I/O device or a physical storage location within system memory.

In the POWER™ RISC architecture, the effective address space is partitioned into a number of uniformly-sized memory pages, where each page has a respective associated address descriptor called a page table entry (PTE). The PTE corresponding to a particular memory page contains the base effective address of the memory page as well as the associated base real address of the page frame, thereby enabling a processor core to translate any effective address within the memory page into a real address in system memory. The PTEs, which are created in system memory by the operating system and/or hypervisor software, are collected in a page frame table.

In order to expedite the translation of effective addresses to real addresses during the processing of memory-mapped I/O and memory access instructions (hereinafter, together referred to simply as "memory referent instructions"), a conventional processor core often employs, among other translation structures, a cache referred to as a translation lookaside buffer (TLB) to buffer recently accessed PTEs within the processor core. Of course, as data are moved into and out of physical storage locations in system memory (e.g., in response to the invocation of a new process or a context switch), the entries in the TLB must be updated to reflect the presence of the new data, and the TLB entries associated with data removed from system memory (e.g., paged out to nonvolatile mass storage) must be invalidated. In many conventional processors such as the POWER™ line of processors available from IBM Corporation, the invalidation of TLB entries is the responsibility of software and is accomplished through the execution of an explicit TLB invalidate entry instruction (e.g., TLBIE in the POWER™ instruction set architecture (ISA)).

In MP computer systems, the invalidation of a PTE is complicated by the fact that each processor core has its own respective TLB, which may cache a copy of the target PTE to be invalidated. In order to maintain a consistent view of system memory across all the processor cores, the invalidation of the target PTE requires the invalidation of all cached copies of the target PTE, if present, within the TLBs of all processor cores. In many conventional MP computer systems, the invalidation of TLB entries in all processor cores in the system is accomplished by the execution of a TLB invalidate entry instruction within an initiating processor core and the broadcast of a TLB invalidate entry request from the initiating processor core to each other processor core in the system. The TLB invalidate entry instruction (or instructions, if multiple TLB entries are to be invalidated) may be followed in the instruction sequence of the initiating processor core by one or more synchronization instructions that guarantee that the TLB entry invalidation has been performed by all processor cores.

In conventional MP computer systems, the TLB invalidate entry instruction and associated synchronization instructions are strictly serialized, meaning that hardware thread of the initiating processor core that includes the TLB invalidate entry instruction must complete processing each instruction (e.g., by broadcasting the TLB invalidate entry request to other processor cores) before execution proceeds to the next instruction of the hardware thread. As a result of this serialization, at least the hardware thread of the initiating processor core that includes the TLB entry invalidation instruction incurs a large performance penalty, particularly if the hardware thread includes multiple TLB invalidate entry instructions.

In multithreaded processing units, it is often the case that at least some of the queues, buffers, and other storage facilities of the processing unit are shared by multiple hardware threads. The strict serialization of the TLBIE invalidate entry instruction and associated synchronization instructions can cause certain of the requests associated with the TLB invalidation to stall in these shared facilities, for example, while awaiting confirmation of the processing of the requests by other processor cores. If not handled appropriately, such stalls can cause other hardware threads sharing the storage facilities to experience high latency and/or to deadlock.

In view of the foregoing, the present invention recognizes that it would be useful and desirable to provide an improved method for maintaining coherency of PTEs in a multithreaded computer system.

BRIEF SUMMARY

The present application recognizes that, in addition to address translation information, PTEs can also be utilized to store additional memory attributes, such as memory protection information. The memory protection information contained in the PTEs can be utilized, for example, by operating system or hypervisor software to restrict the types of memory accesses (e.g., read and/or write and/or instruction fetch) that are permitted for a given memory page. In this way, some memory pages can conveniently be designated as read-only, while other memory pages may be designated as subject to read, write, and/or instruction fetch access.

Conventionally, any time a PTE is modified, for example, to update the address translation specified by the PTE and/or to update the memory attributes of the PTE, the PTE in the page frame table and each copy of the PTE cached in the TLBs distributed throughout an MP computer system must be invalidated through a PTE invalidation sequence. Traditionally, the completion of the PTE invalidation sequence has been delayed until all memory accesses referencing the memory page translated by the PTE have drained from the processor cores and been serviced by their associated cache hierarchies. The reason for enforcing this requirement is to ensure that the address translations performed for all in-flight load-type and store-type requests referencing the memory page are performed using the "old" address translation in the PTE to be invalidated rather than a "new" address translation and thus to guarantee that the in-flight load-type and store-type requests do not access unauthorized regions of memory. Although this rationale is not applicable to updates to PTEs that only change memory attributes, all PTE invalidation sequences conventionally have been handled alike.

However, the present application recognizes that delaying the completion of a PTE invalidation sequence until all memory accesses referencing the memory page translated by the PTE have drained from the processor core and have been serviced by the associated cache hierarchy is unnecessary for PTE updates that only modify memory attributes and do not modify the address translation specified by the PTE. Accordingly, in one or more embodiments, a PTE invalidation sequence is performed without enforcing this draining requirement.

In accordance with at least one embodiment, a multiprocessor data processing system includes a processor core having a translation structure for buffering a plurality of translation entries. The processor core receives a sequence of a plurality of translation invalidation requests. In response to receipt of each of the plurality of translation invalidation requests, the processor core determines that each of the plurality of translation invalidation requests does not require draining of memory referent instructions for which address translation has been performed by reference to a respective one of a plurality of translation entries to be invalidated. Based on the determination, the processor core invalidates the plurality of translation entries in the translation structure without regard to draining from the processor core of memory access requests for which address translation was performed by reference to the plurality of translation entries.

BRIEF DESCRIPTION OF THE SEVERAL VIEWS OF THE DRAWINGS

FIG. 10 is a high level logical flowchart of an exemplary method by which a processor core processes a translation synchronization instruction in accordance with one embodiment;

FIG. 11 is a high level logical flowchart of an exemplary method by which a store queue of a processing unit processes a translation synchronization request in accordance with one embodiment;

DETAILED DESCRIPTION

Figure 1:
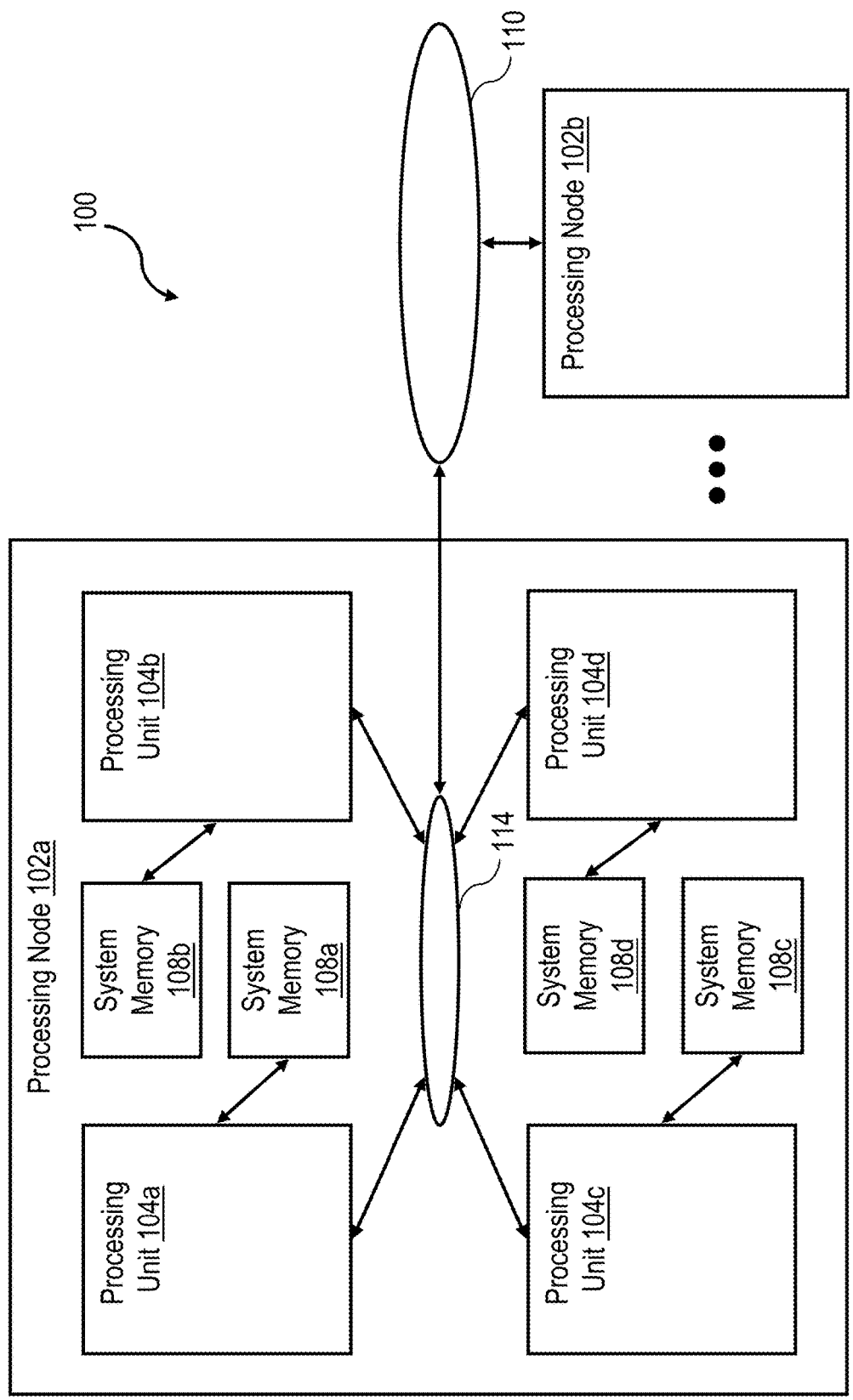
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100 that is directly addressable via real memory addresses. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
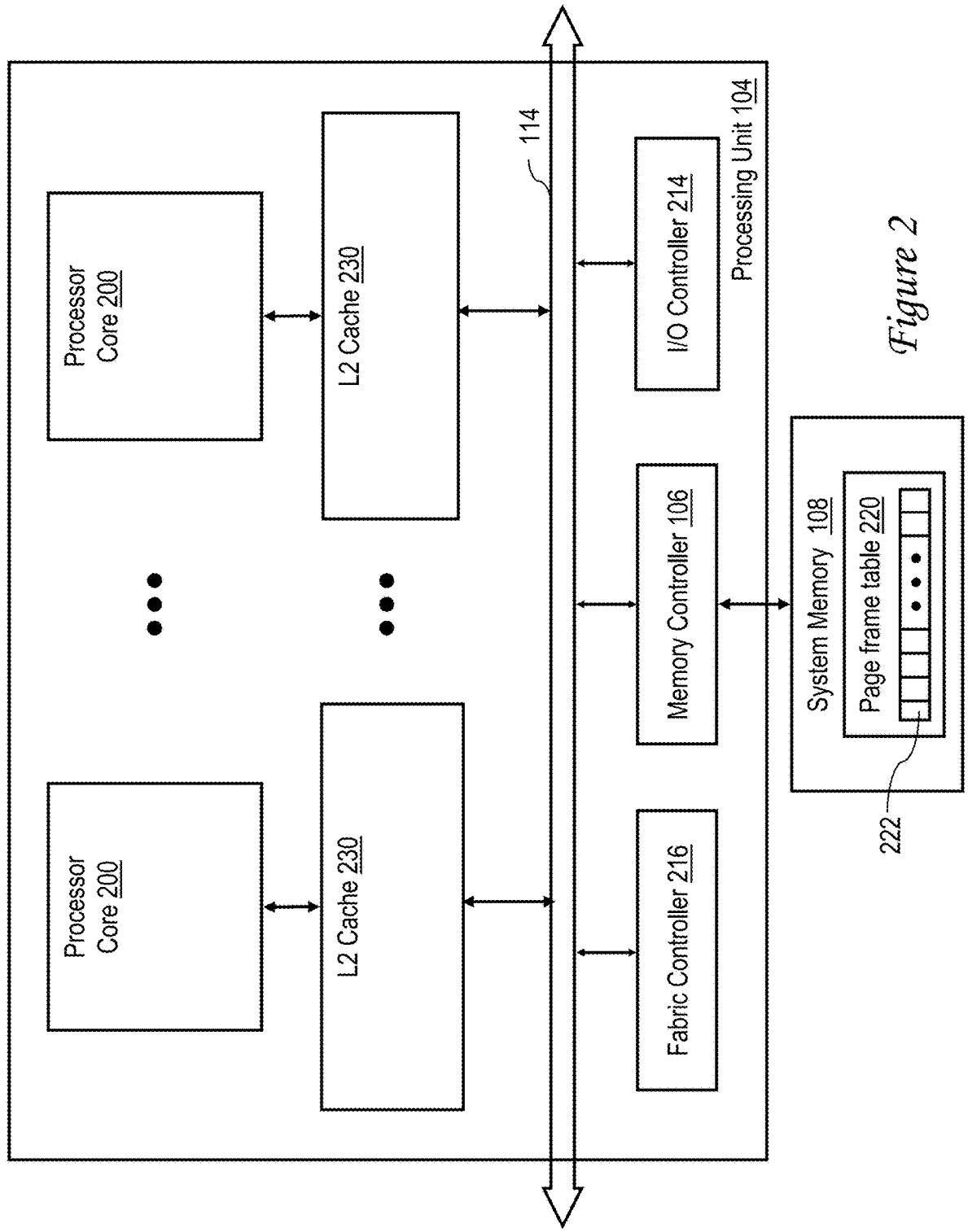
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level a shared system memory 108 accessed via an integrated memory controller 106. As illustrated, shared system memory 108 stores a page frame table 220 containing a plurality of page table entries (PTEs) 222 for performing effective-to-real address translation to enable access to the storage locations in system memory 108. At its upper levels, the multi-level memory hierarchy includes one or more levels of cache memory, which in the illustrative embodiment include a store-through level one (L1) cache 302 (see FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

Figure 3:
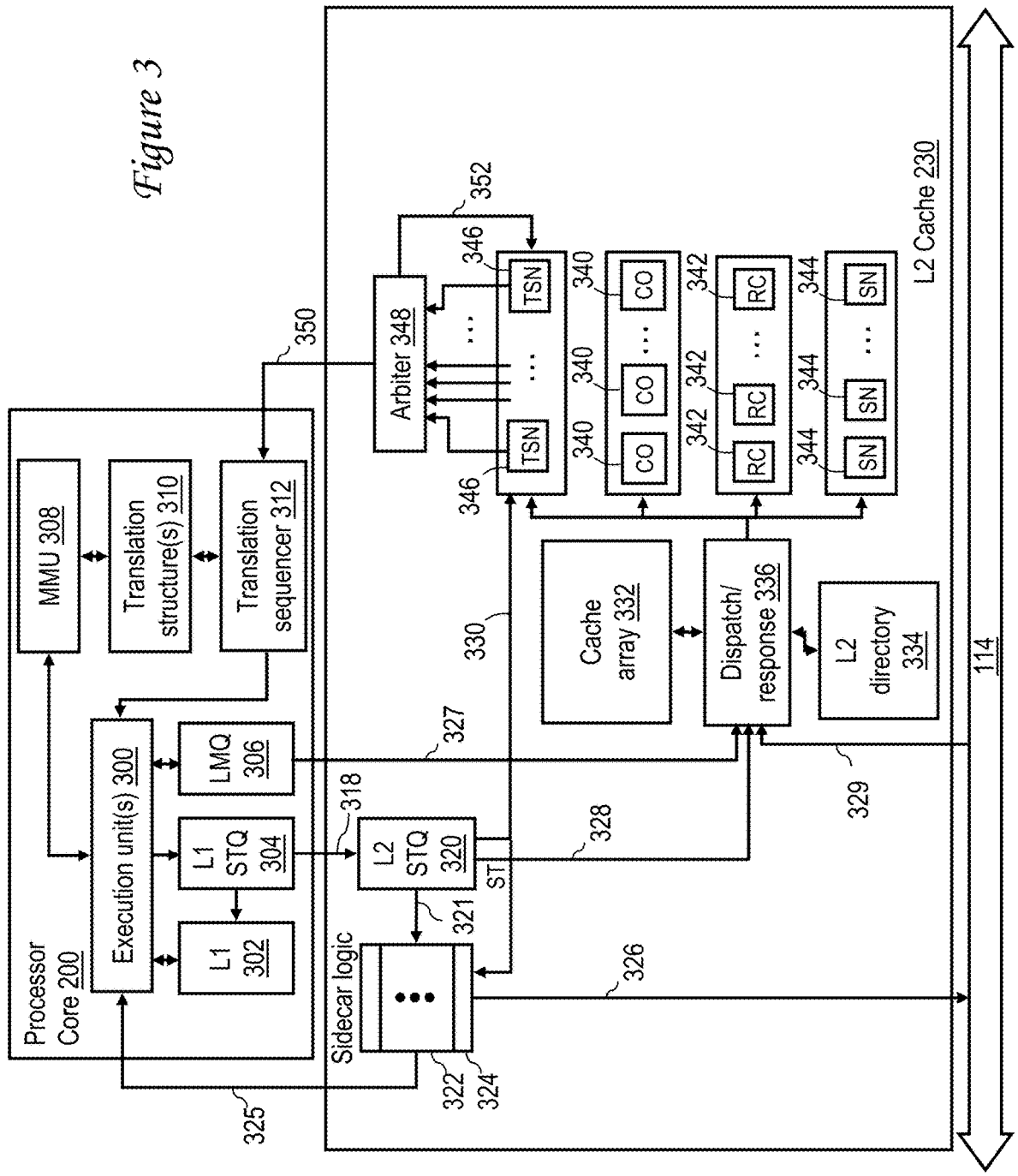
FIG. 3 is a detailed block diagram of a processor core and lower level cache memory in accordance with one embodiment.

With reference now to FIG. 3, there is illustrated a more detailed block diagram of a processor core 200 and its affiliated L2 cache 230 in accordance with one embodiment.

In the illustrated embodiment, processor core 200 includes one or more execution unit(s) 300, which execute instructions from multiple simultaneous hardware threads of execution. The instructions can include, for example, arithmetic instructions, logical instructions, and memory referent instructions, as well as translation entry invalidation instructions (hereinafter referred to by the POWER™ ISA mnemonic TLBIE (Translation Lookaside Buffer Invalidate Entry)) and associated synchronization instructions. Execution unit(s) 300 can generally execute instructions of a hardware thread in any order as long as data dependencies and explicit orderings mandated by synchronization instructions are observed.

Processor core 200 additionally includes a memory management unit (MMU) 308 responsible for translating target effective addresses determined by the execution of memory referent instructions in execution unit(s) 300 into real addresses. MMU 308 performs effective-to-real address translation by reference to one or more translation structure(s) 310, such as a translation lookaside buffer (TLB), block address table (BAT), segment lookaside buffers (SLBs), etc. The number and type of these translation structures varies between implementations and architectures. If present, the TLB reduces the latency associated with effective-to-real address translation by caching PTEs 222 retrieved from page frame table 220. A translation sequencer 312 associated with translation structure(s) 310 handles invalidation of effective-to-real translation entries held within translation structure(s) 310 and manages such invalidations relative to memory referent instructions in flight in processor core 200.

Processor core 200 additionally includes various storage facilities shared by the multiple hardware threads supported by processor core 200. The storage facilities shared by the multiple hardware threads include an L1 store queue 304 that temporarily buffers store and synchronization requests generated by execution of corresponding store and synchronization instructions by execution unit(s) 300. Because L1 cache 302 is a store-through cache, meaning that coherence is fully determined at a lower level of cache hierarchy (e.g., at L2 cache 230), store requests flow through L1 STQ 304 and then pass via bus 318 to L2 cache 230 for processing. Because such store requests have not yet been fully processed through the point of coherence at L2 cache 230, the store requests dependent on the address translation provided by a translation entry must be ordered ahead of any update to the address translation in order to avoid corrupting the memory page translated by the translation entry. The storage facilities of processor core 200 shared by the multiple hardware threads additionally include a load miss queue (LMQ) 306 that temporarily buffers load requests that miss in L1 cache 302. Because such load requests have not yet been satisfied, they are subject to hitting the wrong memory page if the address translation utilized to obtain the target real addresses of the load requests is updated before the load requests are satisfied. Consequently, if the effective address range specified in a PTE that is cached in a translation entry is to be reassigned to a different real address range, any load request in LMQ 306 that depends on the translation entry has to be drained from LMQ 306 and be satisfied before the effective address translated by the relevant translation entry can be reassigned.

Still referring to FIG. 3, L2 cache 230 includes a cache array 332 and a L2 directory 334 of the contents of cache array 332. Assuming cache array 332 and L2 directory 334 are set associative as is conventional, storage locations in system memories 108 are mapped to particular congruence classes within cache array 332 utilizing predetermined index bits within the system memory (real) addresses. The particular memory blocks stored within the cache lines of cache array 332 are recorded in L2 directory 334, which contains one directory entry for each cache line. While not expressly depicted in FIG. 3, it will be understood by those skilled in the art that each directory entry in cache directory 334 includes various fields, for example, a tag field that identifies the real address of the memory block held in the corresponding cache line of cache array 332, a state field that indicates the coherency state of the cache line, an LRU (Least Recently Used) field indicating a replacement order for the cache line with respect to other cache lines in the same congruence class, and inclusivity bits indicating whether the memory block is held in the associated L1 cache 302.

L2 cache 230 additionally includes an L2 STQ 320 that receives storage-modifying requests and synchronization requests from L1 STQ 304 via interface 318 and buffers such requests. It should be noted that L2 STQ 320 is a unified store queue that buffers requests for all hardware threads of the affiliated processor core 200. Consequently, all of the threads' store requests, TLBIE requests, and associated synchronization requests flow through L2 STQ 320. Although in most embodiments L2 STQ 320 includes multiple entries, L2 STQ 320 is required to function in a deadlock-free manner regardless of depth (i.e., even if implemented as a single entry queue). To this end, L2 STQ 320 is coupled by an interface 321 to associated sidecar logic 322, which includes one request-buffering entry 324 (referred to herein as a "sidecar") 324 per hardware thread supported by the affiliated processor core 200. As such, the number of sidecars 324 is unrelated to the number of entries in L2 STQ 320. As described further herein, use of sidecars 324 allows potentially deadlocking requests to be removed from L2 STQ 320 so that no deadlocks occur during invalidation of a translation entry.

L2 cache 230 further includes dispatch/response logic 336 that receives local load and store requests initiated by the affiliated processor core 200 via buses 327 and 328, respectively, and remote requests snooped on local interconnect 114 via bus 329. Such requests, including local and remote load requests, store requests, TLBIE requests, and associated synchronization requests, are processed by dispatch/response logic 336 and then dispatched to the appropriate state machines for servicing.

In the illustrated embodiment, the state machines implemented within L2 cache 230 to service requests include multiple Read-Claim (RC) machines 342, which independently and concurrently service load (LD) and store (ST) requests received from the affiliated processor core 200. In order to service remote memory access requests originating from processor cores 200 other than the affiliated processor core 200, L2 cache 230 also includes multiple snoop (SN) machines 344. Each snoop machine 344 can independently and concurrently handle a remote memory access request snooped from local interconnect 114. As will be appreciated, the servicing of memory access requests by RC machines 342 may require the replacement or invalidation of memory blocks within cache array 332 (and L1 cache 302). Accordingly, L2 cache 230 also includes CO (castout) machines 340 that manage the removal and writeback of memory blocks from cache array 332.

In the depicted embodiment, L2 cache 230 additionally includes multiple translation snoop (TSN) machines 346, which are utilized to service TLBIE requests and associated synchronization requests. It should be appreciated that in some embodiments, TSN machines 346 can be implemented in another sub-unit of a processing unit 104, for example, a non-cacheable unit (NCU) (not illustrated) that handles non-cacheable memory access operations. In at least one embodiment, the same number of TSN machines 346 is implemented at each L2 cache 230 in order to simplify implementation of a consensus protocol (as discussed further herein) that coordinates processing of multiple concurrent TLBIE requests within data processing system 100.

TSN machines 346 are all coupled to an arbiter 348 that selects requests being handled by TSN machines 346 for transmission to translation sequencer 312 in processor core 200 via bus 350. In at least some embodiments, bus 350 is implemented as a unified bus that transmits not only requests of TSN machines 346, but also returns data from the L2 cache 230 to processor core 200, as well as other operations. It should be noted that translation sequencer 312 must accept requests from arbiter 348 in a non-blocking fashion in order to avoid deadlock.

Figures 4A, 4B, 5:
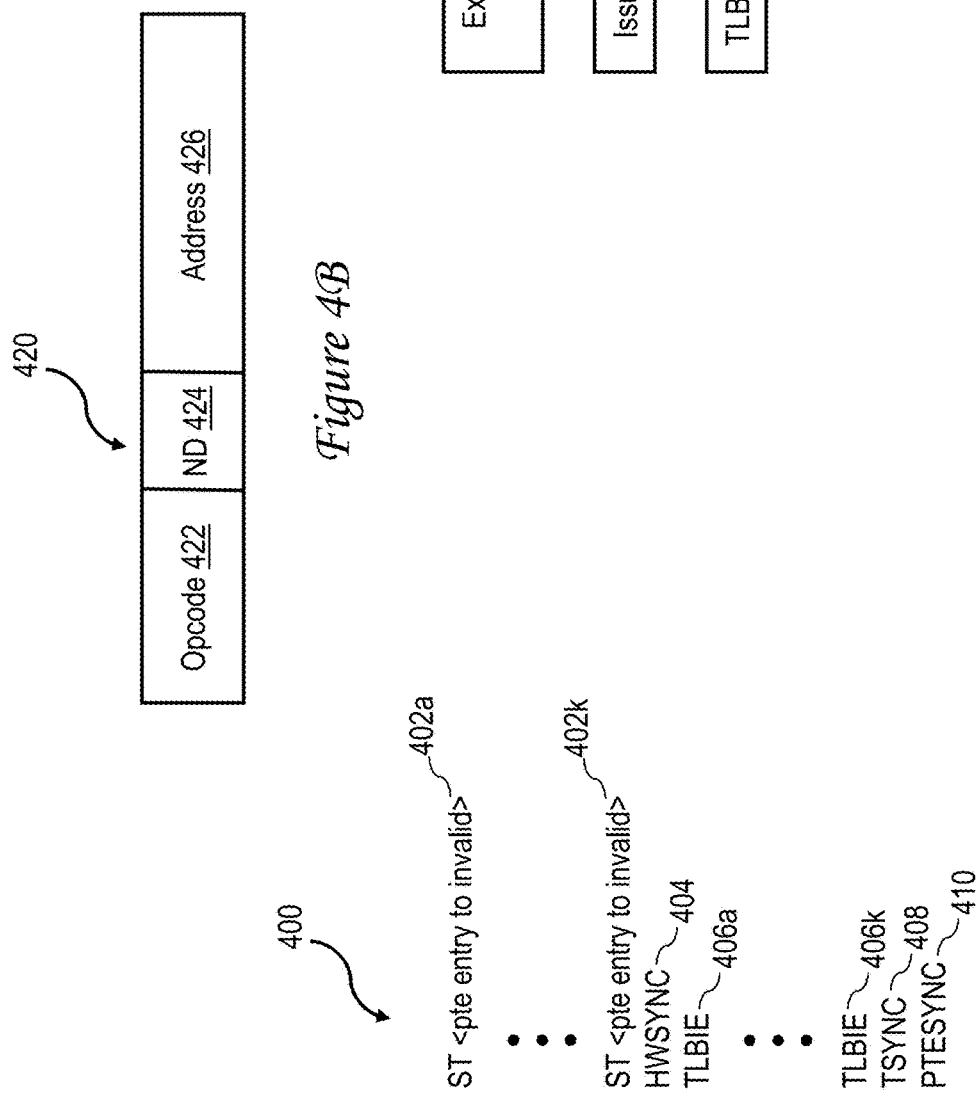
FIG. 4A is an exemplary translation entry invalidation instruction sequence in accordance with one embodiment.
FIG. 4B illustrates an exemplary translation entry invalidation instruction in accordance with one embodiment.
FIG. 5 is a high level logical flowchart of an exemplary method by which a processor core of a multiprocessor data processing system processes a translation entry invalidation instruction in accordance with one embodiment.

Referring now to FIG. 4A, there is depicted an exemplary translation entry invalidation instruction sequence 400 that may be executed by a processor core 200 of data processing system 100 in accordance with one embodiment. The purpose of instruction sequence 400 is to: (a) disable one or more translation entries (e.g., PTEs 222) in page frame table 220 so that the translation entry or entries do not get reloaded by any MMU 308 of data processing system 100, (b) invalidate any copy or copies of the translation entry or entries (or any other translation entry that translates the same effective address as one of the translation entries) cached by any processor core 200 in data processing system 100, and (c) if necessary, drain all the outstanding memory access requests that depend on the old translation entry or entries before the effective address(es) is/are re-assigned. If the address translation were updated before the store requests that depend on the old translation entry drain, the store requests may corrupt the memory page identified by old translation entry. Similarly, if load requests that depend on the old translation entry and that miss L1 cache 302 were not satisfied before the address translation is reassigned, the load requests would read data from a different memory page than intended and thus observe data not intended to be visible to the load requests.

Instruction sequence 400, which may be preceded and followed by any arbitrary number of instructions, begins with one or more store (ST) instructions 402a-402k, referred to generally as store instruction(s) 402. Each store instruction 402, when executed, causes a store request to be generated that, when propagated to the relevant system memory 108, marks a target PTE 222 in page frame table 220 as invalid. Once the store request has marked the PTE 222 as invalid in page frame table 220, MMUs 308 will no longer load the invalidated translation from page frame table 220.

Following the one or more store instructions 402 in instruction sequence 400 is a heavy weight synchronization (i.e., HWSYNC) instruction 404, which is a barrier that ensures that the following TLBIE instruction(s) 406a-406k (referred to generally as TLBIE instructions 406) do not get reordered by processor core 200 such that any of TLBIE instruction(s) 406 executes in advance of any of store instruction(s) 402. Thus, HWSYNC instruction 404 ensures that if a processor core 200 reloads a PTE 222 from page frame table 220 after a TLBIE instruction 406 invalidates cached copies of the PTE 222, the processor core 200 is guaranteed to have observed the invalidation due to a store instruction 402 and therefore will not use or re-load the target PTE 222 into translation structure(s) 310 until the target PTE 222 is again set to valid.

Following HWSYNC instruction 404 in instruction sequence 400 are one or more TLBIE instructions 406a-406k, each of which, when executed, generates a corresponding TLBIE request that invalidates any translation entries translating the target effective address of the TLBIE request in all translation structures 310 throughout data processing system 100. The TLBIE instruction(s) 406 are followed in instruction sequence 400 by a translation synchronization (i.e., TSYNC) instruction 408 that ensures that, prior to execution of the thread proceeding to succeeding instructions, the TLBIE request(s) generated by execution of TLBIE instruction(s) 406 have finished invalidating all relevant translation entries in all translation structures 310 throughout data processing system 100 and, if necessary, all prior memory access requests depending on the now-invalidated translation(s) have drained.

Instruction sequence 400 ends with a PTESYNC instruction 410 that enforces a barrier that prevents any memory referent instructions following PTESYNC instruction 410 in program order from executing until TSYNC instruction 408 has completed its processing. In this manner, any younger memory referent instruction requiring translation of the target effective address of the TLBIE request will be translated by reference to a possibly updated address translation and be handled in accordance with possibly updated memory attributes rather than in accordance with the address translation and memory attributes contained in the translation entry invalidated by a TLBIE request. It should be noted that PTESYNC instruction 410 does not have any function directly pertaining to invalidation of the target PTE 222 in page frame table, the invalidation of translation entries in translation structures 310, or draining of memory referent instructions that depend on the old translation.

Referring now to FIG. 4B, there is illustrated an exemplary translation entry invalidation instruction in accordance with one embodiment. In this example, translation entry invalidation instruction 420, which can be, for example, a TLBIE instruction such as one of TLBIE instructions 406, includes an opcode field 422 that identifies the instruction as a translation entry invalidation instruction and an address field 426 that specifies (e.g., via identification of one or more source registers) an effective or virtual address for which all cached copies of translation entries are to be invalidated. In accordance with a preferred embodiment, translation entry invalidation instruction 420 additionally includes a "no drain" (ND) field 424, which in some implementations can form a portion of opcode field 422 and in other implementations, can be implemented as a separate field. ND field 424 indicates whether or not servicing the translation entry invalidation request generated by execution of translation entry invalidation instruction 420 requires draining of any memory referent instructions dependent on the target translation entry prior to completion of the PTE invalidation sequence including instruction 420. Thus, for example, if ND field 424 is set to a first setting (e.g., '1'), the translation entry invalidation request generated by execution of translation entry invalidation instruction 420 does not require a processor core to drain memory referent instructions dependent on the target translation entry prior to completion of the PTE invalidation sequence. A programmer would select this setting, for example, if the memory attributes of the translation entry are to be updated, but the address translation specified by the translation entry is to remain unchanged. Clearly, if only the memory attributes are being changed in a PTE update, draining of memory referent instructions dependent on the address translation contained in the target PTE is not required because the same real addresses will be accessed before and after the PTE update. On the other hand, if the address translation specified by the PTE is being changed, all memory referent instructions dependent on the address translation contained in the target PTE must be serviced with respect to the old memory page, and memory referent instructions subsequent to the PTE invalidation sequence in program order must be serviced with respect to a different new memory page. Thus, draining of memory referent instructions dependent on the address translation contained in the target PTE is required prior to completion of such PTE invalidation sequences. This draining requirement is indicated by a second setting (e.g., '0') of ND field 424. When ND field 424 is set to the second setting, the translation entry invalidation request generated by execution of translation entry invalidation instruction 420 requires a processor core to drain any memory referent instructions dependent on the target translation entry prior to completion of the PTE invalidation sequence.

Those skilled in the art will appreciate that other techniques can be utilized to indicate that translation entry invalidation does or does not require draining of memory referent instructions dependent on the address translation contained in a target translation entry to be invalidated. For example, in some embodiments, draining or non-draining can alternatively or additionally be indicated via a mode register and/or a prefix instruction preceding a translation entry invalidation instruction in program order. To promote understanding of the inventions disclosed herein, the processing of instruction sequence 400 in a first set of embodiments is described with reference to FIGS. 5-14.

Referring first to FIG. 5, there is illustrated a high level logical flowchart of an exemplary method by which an initiating processor core 200 of a multiprocessor data processing system 100 processes a translation entry invalidation (e.g., TLBIE) instruction in accordance with one embodiment. The illustrated process represents the processing performed in a single hardware thread, meaning that multiple of these processes can be performed concurrently (i.e., in parallel) on a single processor core 200, and further, that multiple of these processes can be performed concurrently on various different processing cores 200 throughout data processing system 100. As a result, multiple different address translation entries buffered in the various processor cores 200 of data processing system 100 can be invalidated by different initiating hardware threads in a concurrent manner.

The illustrated process begins at block 500 and then proceeds to block 502, which illustrates execution of a TLBIE instruction 420 in an instruction sequence 400 by execution unit(s) 300 of a processor core 200. Execution of TLBIE instruction 420 determines a target effective address for which all translation entries buffered in translation structure(s) 310 throughout data processing system 100 are to be invalidated. Importantly, in response to execution of TLBIE instruction 406, processor core 200 does not pause the dispatch of instructions in the initiating hardware thread, meaning that TLBIE instructions 406a-406k in instruction sequence 400 can be executed without delay or interruption.

At block 504, a TLBIE request corresponding to TLBIE instruction 420 is generated and issued to L1 STQ 304. The TLBIE request may include, for example, a transaction type indicating the type of the request (i.e., TLBIE), the effective address for which cached address translations are to be invalidated, an indication of the initiating processor core 200 and hardware thread that issued the TLBIE request, and an indication (based on the setting of ND field 424) of whether or not the TLBIE is non-draining. Processing of store requests, TLBIE requests, and other requests buffered in L1 STQ 304 progresses, and the TLBIE request eventually moves from L1 STQ 304 to L2 STQ 320 via bus 318 as indicated at block 506. Thereafter, the process of FIG. 5 ends at block 508.

Figure 6:
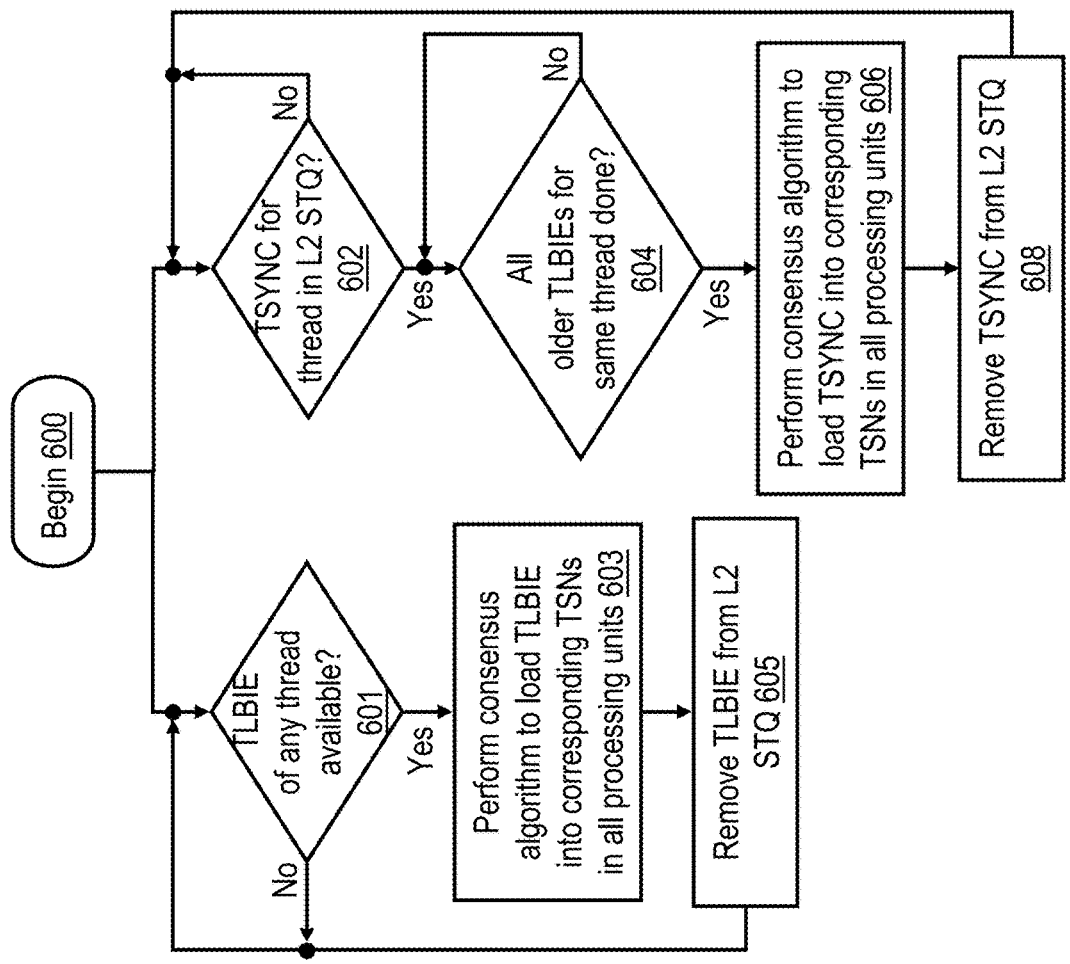
FIG. 6 is a high level logical flowchart of an exemplary method by which a snooper of a processing unit handles translation entry invalidation requests and translation synchronization requests in accordance with one embodiment.

Referring now to FIG. 6, there is depicted a high level logical flowchart of an exemplary method by which an L2 STQ 320 of an L2 cache 230 processes translation entry invalidation (e.g., TLBIE) requests and translation synchronization (e.g., TSYNC) requests of a hardware thread of the affiliated processor core 200 in accordance with one embodiment. The process of FIG. 6 is performed on a per-thread basis.

The process of FIG. 6 begins at block 600 and then proceeds to both block 601 and to block 602. Block 601 illustrates L2 STQ 320 determining whether or not a TLBIE request of a hardware thread of the affiliated processor core 200 has been loaded into L2 STQ 320, as described above with reference to block 506 of FIG. 5. If not, the process iterates at block 601. However, in response to a determination at block 601 that a TLBIE request of a hardware thread of the affiliated processor core 200 has been loaded into L2 STQ 320, L2 STQ 320 participates in a consensus protocol (which may be conventional) via local interconnect 114 to ensure that one (and only one) TSN machine 346 in each and every L2 cache 230 receives its TLBIE request (block 603). In addition, the consensus protocol ensures that the various TSN machines 346 only take action to service the TLBIE request once all of the corresponding TSN machines 346 have received the TLBIE request. Thereafter, L2 STQ 320 removes that TLBIE request from its entry within L2 STQ 320 (block 605), and the process returns to block 601, which has been described.

Block 602 illustrates L2 STQ 320 determining whether or not a TSYNC request of a hardware thread of the affiliated processor core 200 has been loaded into L2 STQ 320. The generation of a TSYNC by execution of a corresponding TSYNC instruction 408 is described below with reference to FIG. 10. In response to a negative determination at block 602, the process continues to iterate at block 602. However, in response to a determination that a TSYNC request of a hardware thread of the affiliated processor core 200 has been loaded into L2 STQ 320 as described below with reference to block 1006 of FIG. 10, L2 STQ 320 orders the TSYNC request with respect to older TLBIE requests of the same thread by waiting at block 604 until all of the older TLBIE requests of the same hardware thread, if present, have been removed from L2 STQ 320. In response to determining at block 604 that all older TLBIE requests, if any, have been removed from L2 STQ 320, the process proceeds to block 606, which illustrates L2 STQ 320 participating in a consensus protocol (which may be conventional) via bus 326 and local interconnect 114 to ensure that one (and only one) TSN machine 346 in each and every L2 cache 230 (including the initiating L2 cache 230) receives its TSYNC request. In addition, the consensus protocol ensures that the various TSN machines 346 only take action to service the TSYNC request once all of the corresponding TSN machines 346 have received the TSYNC request. Thereafter, L2 STQ 320 removes that TSYNC request from its entry within L2 STQ 320 (block 608), and the process returns to block 602, which has been described.

Figure 7:
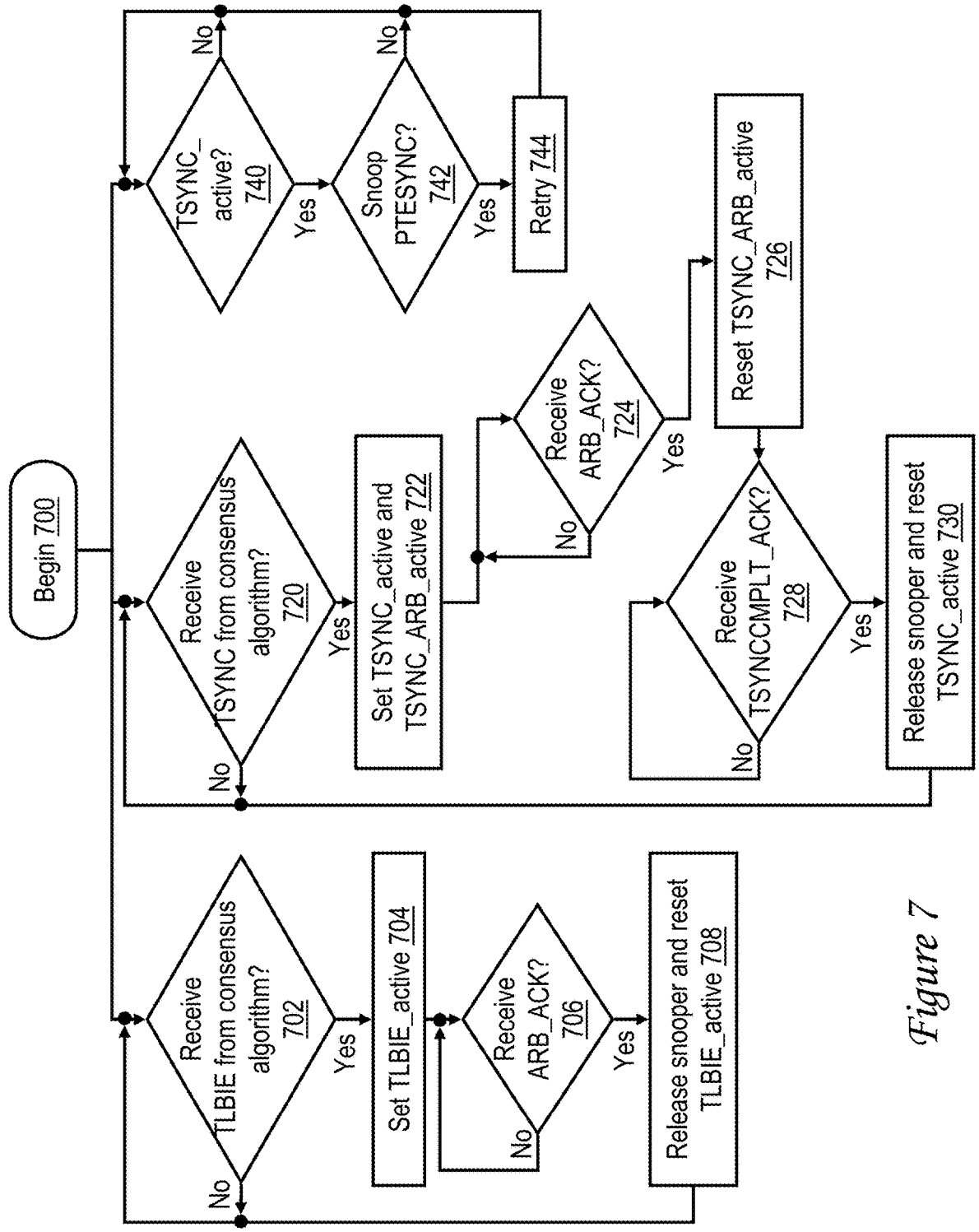
FIG. 7 is a high level logical flowchart of an exemplary method by which a store queue of a processing unit processes translation invalidation requests, translation synchronization requests, and page table synchronization requests in accordance with one embodiment.

With reference now to FIG. 7, there is illustrated a high level logical flowchart of an exemplary method by which TSN machines 346 process TLBIE requests (blocks 702-708), TSYNC requests (blocks 720-730), and PTESYNC requests (blocks 740-744) in accordance with one embodiment. The illustrated process is independently and concurrently performed for each TSN machine 346, which can process at most one of the three enumerated types of requests at any given time.

The process begins at block 700 and then proceeds to blocks 702, 720, and 740. Block 702 and succeeding block 704 illustrate that in response to receipt of a TLBIE request via the consensus protocol a TSN machine 346 buffers the TLBIE request and assumes a TLBIE_active state. The TLBIE request, which is broadcast over the system fabric 110, 114 to the L2 cache 230 of the initiating processor core 200 and those of all other processor cores 200 of data processing system 100 at block 606 of FIG. 6, is received by an L2 cache 230 via interface 329, processed by dispatch/response logic 336 and then assigned to the TSN machine 346. As noted above, in a preferred embodiment, the consensus protocol enforces the condition that the TLBIE request is allocated a TSN machine 346 in one L2 cache 230 only if a TSN machine 346 is similarly allocated to the TLBIE request by all other L2 caches 230. The TSN machine 346 assuming the TLBIE_active state informs the associated arbiter 348 that a TLBIE request is ready to be processed, as described further below with reference to block 802 of FIG. 8.

Block 706 illustrates TSN machine 346 remaining in the TLBIE_active state until the TLBIE request has been forwarded for processing to the associated processor core 200 (i.e., to invalidate the relevant translation entries in translation structure(s) 310 and, if necessary, to drain relevant memory referent requests from processor core 200), as indicated by receipt of an ARB_ACK signal from arbiter 348 via signal line 352. In response to receipt of the ARB_ACK signal, the TLBIE_active state is reset, and the TSN machine 346 is released for reallocation (block 708). Thereafter, the process of FIG. 7 returns from block 708 to block 702, which has been described.

Referring now to blocks 720-730, blocks 720 and succeeding block 722 illustrate that in response to receipt of a TSYNC request via the consensus protocol a TSN machine 346 buffers the TSYNC request and assumes TSYNC_active and TSYNC_ARB_active states. The TSYNC request, which is broadcast over the system fabric 110, 114 to the L2 cache 230 of the initiating processor core 200 and those of all other processor cores 200 of data processing system 100 at block 606 of FIG. 6, is received by an L2 cache 230 via interface 329, processed by dispatch/response logic 336 and then assigned to the TSN machine 346. As noted above, in a preferred embodiment, the consensus protocol enforces the condition that the TSYNC request is allocated a TSN machine 346 in one L2 cache 230 only if a TSN machine 346 is similarly allocated to the TSYNC request by all other L2 caches 230. The TSN machine 346 assuming the TSYNC_ARB_active state informs the associated arbiter 348 that a TSYNC request is ready to be processed, as described further below with reference to block 802 of FIG. 8. The TSYNC_active state additionally indicates that the associated processor core 200 has not yet completed its processing of the TSYNC request.

Block 724 illustrates TSN machine 346 remaining in the TSYNC_ARB_active state until the TSYNC request has been forwarded for processing to the associated processor core 200 (i.e., to invalidate the relevant translation entries in translation structure(s) 310 and, if necessary, to drain relevant memory referent requests from processor core 200), as indicated by receipt of an ARB_ACK signal from arbiter 348 via signal line 352. In response to receipt of the ARB_ACK signal, the TSYNC_ARB_active state is reset (block 726). As indicated at block 728, TSN machine 346 remains in the TSYNC_active state until processing of the TSYNC request by the associated processor core 200 has been completed (i.e., by invalidating the relevant translation entries in translation structure(s) 310 and, if necessary, by draining relevant memory referent requests from processor core 200), as indicated by receipt of a TLBCMPLT_ACK signal from L2 STQ 320 via bus 330. In response to receipt of the TSYNCCMPLT_ACK signal, as discussed below with reference to block 1206 of FIG. 12, the TSYNC_active state is reset, and the TSN machine 346 is released for reallocation (block 730). Thereafter, the process of FIG. 7 returns from block 730 to block 720, which has been described.

Referring now to blocks 740-744, a TSN machine 346 determines at block 740 if it is in the TSYNC_active state established at block 722. If not, the process iterates at block 740. If, however, the TSN machine 346 is in the TSYNC_active state established at block 722, the TSN machine 346 monitors to determine if a PTESYNC request for the initiating hardware thread of its TLBIE request has been detected (block 742). Generation of a PTESYNC request by execution of a corresponding PTESYNC instruction is described below with reference to FIG. 13. If no PTESYNC request is detected, the process continues to iterate at blocks 740-742. However, in response to a detection of a PTESYNC request of the initiating hardware thread of its TSYNC request while TSN machine 346 is in the TSYNC_active state, TSN machine 346 provides a Retry coherence response via the system fabric 110, 114, as indicated at block 744. As discussed below with reference to blocks 1406-1408 of FIG. 14, a Retry coherence response by any TSN snooper 346 handling the TSYNC request for the initiating hardware thread forces the PTESYNC request to be reissued by the source L2 cache 230 and prevents the initiating hardware thread from progressing until the PTETSYNC request completes without a Retry coherence response. The PTETSYNC request completes without a Retry coherence response when all processor cores 200 other than the initiating processor core 200 have completed their processing of the TSYNC request. It should be noted in this regard that PTESYNC requests are not and need not be self-snooped by the initiating L2 cache 230.

Figure 8:
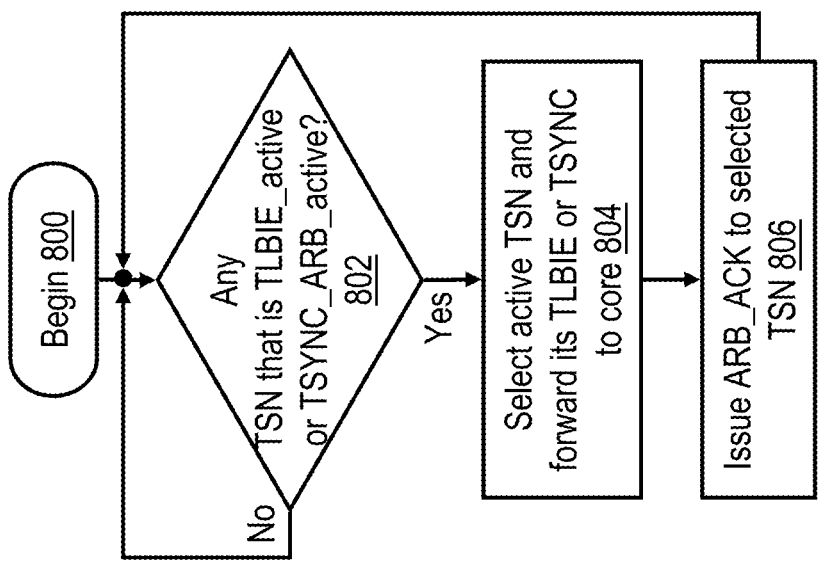
FIG. 8 is a high level logical flowchart of an exemplary method by which an arbiter of a processing unit processes translation entry invalidation requests and translation synchronization requests in accordance with one embodiment.

Referring now to FIG. 8, there is depicted a high level logical flowchart of an exemplary method by which an arbiter 348 of the L2 cache 230 processes TLBIE and TSYNC requests of TSN machines 346 in accordance with one embodiment. The process begins at block 800 and then proceeds to block 802, which illustrates arbiter 348 determining whether or not any of its TSN machines 346 is in one of the TLBIE_active or TSYNC_ARB_active states. If not, the process of FIG. 8 iterates at block 802. However, in response to determining that one or more of its TSN machines 346 are in the TLBIE_active or TSYNC_ARB_active states, arbiter 348 selects one of the TSN machines 346 in the TLBIE_active or TSYNC_ARB_active state that has not been previously had its request forwarded and transmits its TLBIE or TSYNC request via interface 350 to the translation sequencer 312 of the affiliated processor core 200 (block 804). To avoid deadlock, translation sequencer 312 is configured to accept TLBIE and TSYNC requests within a fixed time and not arbitrarily delay accepting TLBIE and TSYNC requests.

The process proceeds from block 804 to block 806, which depicts arbiter 348 issuing an ARB_ACK signal to the selected TSN 346 to signify forwarding of the relevant request to translation sequencer 312 of the affiliated processor core 200, as discussed at blocks 706 and 724 of FIG. 7. Thereafter, the process of FIG. 8 returns to block 802. The process of FIG. 8 thus enables TLBIE and TSYNC requests to be communicated to processor core 200 in a pipelined fashion.

Figure 9:
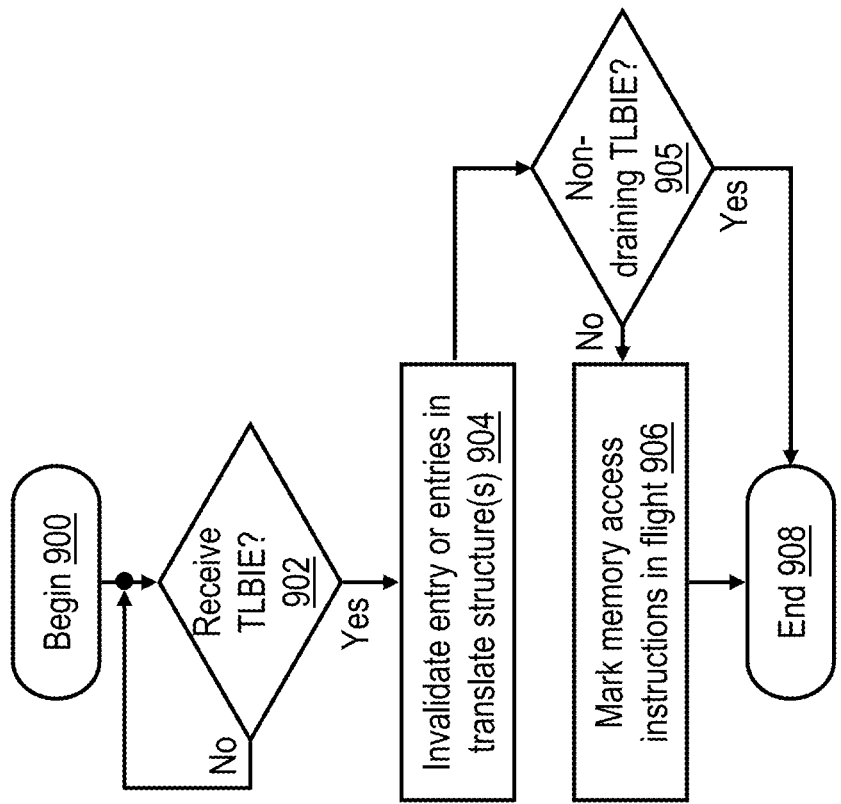
FIG. 9 is a high level logical flowchart of an exemplary method by which a translation sequencer of a processor core processes a translation entry invalidation request in accordance with one embodiment.

With reference now to FIG. 9, there is illustrated a high level logical flowchart of an exemplary method by which a translation sequencer 312 of an initiating or snooping processor core 200 processes a TLBIE request in accordance with one embodiment. The process shown in FIG. 9 begins at block 900 and then proceeds to block 902, which illustrates translation sequencer 312 awaiting receipt of a TLBIE request forwarded by arbiter 348 as described above with reference to block 804 of FIG. 8. In response to receipt of a TLBIE request, translation sequencer 312 invalidates one or more translation entries (e.g., PTEs or other translation entries) in translation structure(s) 310 that translate the target effective address of TLBIE request (block 904). At block 905, translation sequencer 312 determines from the TLBIE request indicates that it is non-draining. If so, no marking of memory referent instructions dependent upon the address translation of the now-invalidated translation entries is required or performed. As should be appreciated, if the processor core 200 refrains for marking memory access requests based on a TLBIE request being non-draining, no delay (latency) is incurred waiting for any memory access requests that may have had their target addresses translated by the invalidated TLB to drain. Thereafter, the process of FIG. 9 ends at block 908.

Returning to block 905, in response to translation sequencer 312 determining at block 905 that the TLBIE request is not non-draining, translation sequencer 312 marks all memory referent requests that are to be drained from the processor core 200 (block 906). In a less precise embodiment, at block 906 translation sequencer 312 marks all memory referent requests of all hardware threads in processor core 200 that have had their target addresses translated under the assumption that any of such memory referent requests may have had its target address translated by a translation entry or entries invalidated by the TLBIE request received at block 902. Thus, in this embodiment, the marked memory reference requests would include all store requests in L1 STQ 304 and all load requests in LMQ 306. This embodiment advantageously eliminates the need to implement comparators for all entries of L1 STQ 304 and LMQ 306, but can lead to higher latency due to long drain times.

A more precise embodiment implements comparators for all entries of L1 STQ 304 and LMQ 306. In this embodiment, each comparator compares a subset of effective address bits that are specified by the TLBIE request (and that are not translated by MMU 308) with corresponding real address bits of the target real address specified in the associated entry of L1 STQ 304 or LMQ 306. Only the memory referent requests for which the comparators detect a match are marked by translation sequencer 312 at block 906. Thus, this more precise embodiment reduces the number of marked memory access requests at the expense of additional comparators.

In some implementations of the less precise and more precise marking embodiments, the marking applied by translation sequencer 312 is applied only to memory access requests within processor core 200 and persists only until the marked memory access requests drain from processor core 200 to L2 cache 230. In such implementations, L2 cache 230 may revert to pessimistically assuming all store requests in flight in L2 cache 230 could have had their addresses translated by a translation entry invalidated by the TLBIE request and force all such store requests to be completed from a coherence perspective prior to processing store requests utilizing a new translation of the target effective address of the TLBIE request. In other implementations, the more precise marking applied by translation sequencer 312 extends to store requests in flight in L2 cache 230 as well. Following block 906, the process of FIG. 9 ends at block 908.

Referring now to FIG. 10, there is depicted a high level logical flowchart of an exemplary method by which a processor core 200 processes a translation synchronization (e.g., TSYNC) instruction in accordance with one embodiment.

The illustrated process begins at block 1000 and then proceeds to block 1001, which illustrates execution of a TSYNC instruction 408 in an instruction sequence 400 by execution unit(s) 300 of a processor core 200. As indicated at block 1002, execution of the TSYNC instruction generates a TSYNC request corresponding to TSYNC instruction 408 that is issued to L1 STQ 304. The TSYNC request may include, for example, a transaction type indicating the type of the request (i.e., TSYNC) and an indication of the initiating processor core 200 and hardware thread that issued the TSYNC request. In response to receipt of the TSYNC request, L1 STQ 304 enforces ordering with TLBIE requests generated from TLBIE instructions 406. In particular, as shown at block 1004, L1 STQ 304 does not issue the TSYNC request to L2 STQ 320 until all older TLBIE requests of the same hardware thread are issued to L2 STQ 320. Once any such older TLBIE requests have been issued to L2 STQ 320, L1 STQ 304 issues the TSYNC request to L2 STQ 320 via bus 318 as indicated at block 1006. Thereafter, the process of FIG. 10 ends at block 1010.

Once the TSYNC request is received in L2 STQ 320 in accordance with the process of FIG. 10, L2 STQ 320 broadcasts the TSYNC request to a TSN 346 of each L2 cache 230 as discussed above with reference at block 602 and following blocks of FIG. 6. The TSYNC request is eventually forwarded for processing to the processor core 200 in accordance with the processes of FIGS. 7 and 8.

With reference now to FIG. 11, there is illustrated a high level logical flowchart of an exemplary method by which a translation sequencer 312 of an initiating or snooping processor core 200 processes a TSYNC request in accordance with one embodiment. The process shown in FIG. 11 begins at block 1100 and then proceeds to block 1102, which illustrates translation sequencer 312 awaiting receipt of a TSYNC request forwarded by arbiter 348 as described above with reference to block 804 of FIG. 8.

The process of FIG. 11 proceeds from block 1102 to block 1106, which illustrates translation sequencer 312 waiting for the memory access requests, if any, marked at block 906 to drain from processor core 200. In particular, translation sequencer 312 waits until all marked load requests, if any, have had their requested data returned to processor core 200 and all marked store requests, if any, have been issued to L2 STQ 320. In response to all marked memory access requests, if any, draining from processor core 200, translation sequencer 312 inserts a TSYNCCMPLT request into L2 STQ 320 to indicate that servicing of the TSYNC request by translation sequencer 312 is complete (block 1108). Thereafter, the process of FIG. 11 ends at block 1110.

Figure 12:
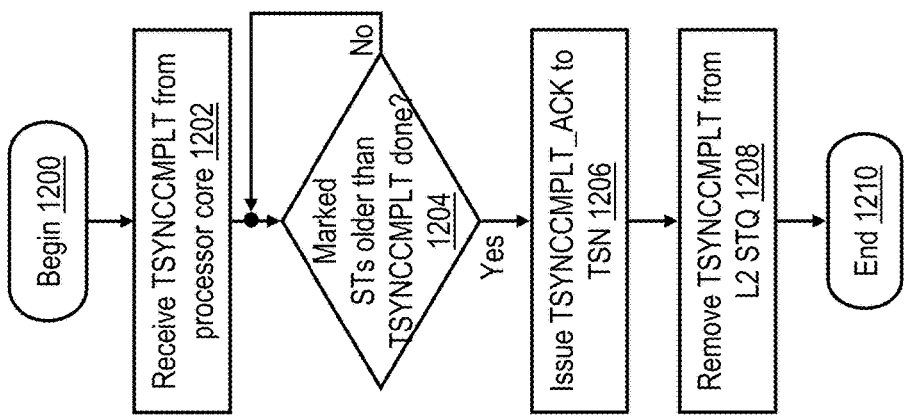
FIG. 12 is a high level logical flowchart of an exemplary method by which a translation sequencer of a processor core processes a translation synchronization complete request in accordance with one embodiment.

Referring now to FIG. 12, there is depicted a high level logical flowchart of an exemplary method by which an L2 STQ 320 processes a TSYNCCMPLT request in accordance with one embodiment. The process of FIG. 12 begins at block 1200 and then proceeds to block 1202, which illustrates L2 STQ 320 receiving and enqueuing in one of its entries a TSYNCCMPLT request issued by its associated processor core 200 as described above with reference to block 1108 of FIG. 11. At illustrated at block 1204, following receipt of the TSYNCCMPLT request L2 STQ 320 enforces store ordering by waiting until all marked store requests, if any, of all hardware threads that are older (i.e., received by L2 STQ 320 earlier in time) drain from L2 STQ 320. Once all of the marked older store requests, if any, have drained from L2 STQ 320, the process proceeds from block 1204 to block 1206, which illustrates L2 STQ 320 transmitting a TSYNCCMPLT_ACK signal via bus 330 to TSN machine 346 that issued the TSYNC request, which as noted above with reference to block 728 is awaiting confirmation of completion of processing of the TSYNC request. Processing of the TSYNCMPLT request is then complete, and L2 STQ 320 removes the TSYNCCMPLT request from L2 STQ 320 (block 1208). Thereafter, the process ends at block 1210.

Figure 13:
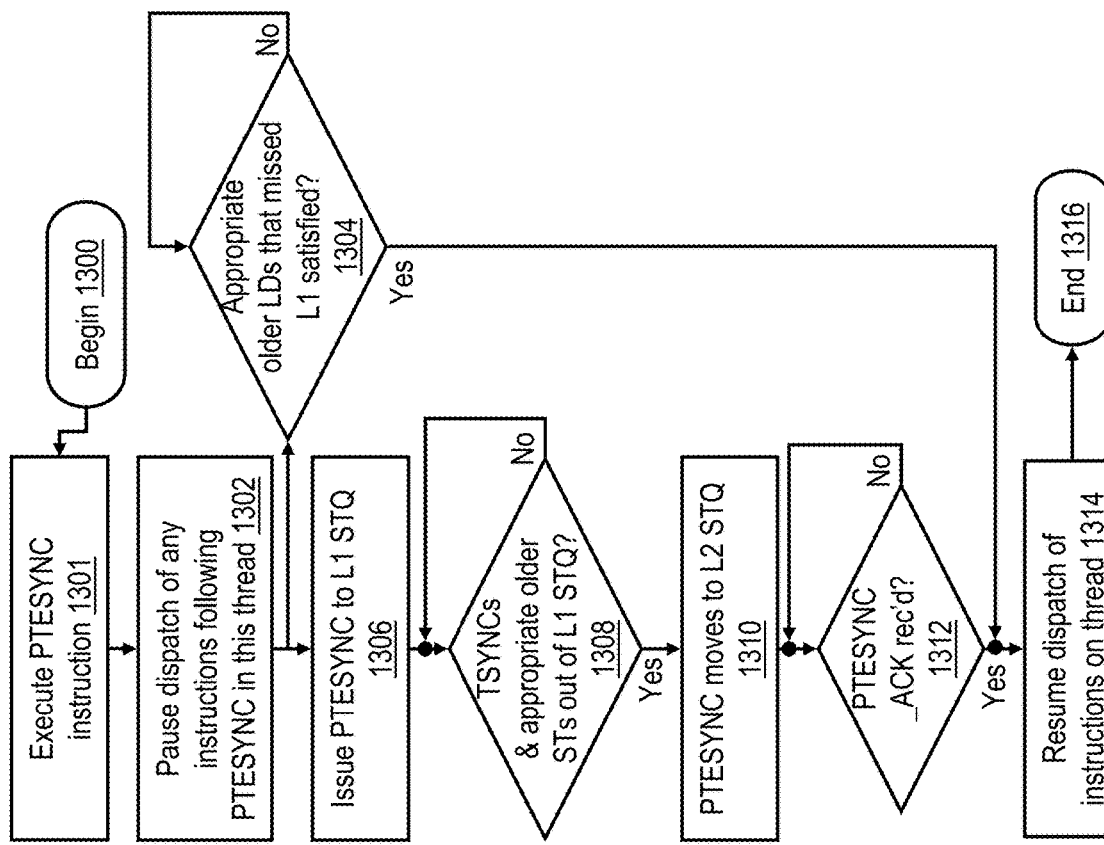
FIG. 13 is a high level logical flowchart of an exemplary method by which a processing core processes a page table synchronization instruction in accordance with one embodiment.

With reference now to FIG. 13, there is illustrated a high level logical flowchart of an exemplary method by which a processing core 200 processes a page table synchronization (e.g., PTESYNC) instruction 430 in accordance with one embodiment. As noted above, PTESYNC instruction 430 and the PTESYNC request generated by its execution have two functions, namely, ensuring systemwide completion of the TLBIE request(s) generated by TLBIE instruction(s) 426 and TSYNC request generated by TSYNC instruction 408 and to enforce instruction ordering with respect to younger memory referent instructions.

The illustrated process begins at block 1300 and then proceeds to block 1301, which illustrates a processor core 200 generating a PTESYNC request by execution of a PTESYNC instruction 410 in an instruction sequence 400 in execution unit(s) 300. The PTESYNC request may include, for example, a transaction type indicating the type of the request (i.e., PTESYNC) and an indication of the initiating processor core 200 and hardware thread that issued the PTESYNC request. In response to execution of PTESYNC instruction 430, processor core 200 pauses the dispatch of any younger instructions in the initiating hardware thread (block 1302). Dispatch is paused because in the exemplary embodiment of FIG. 3 sidecar logic 322 includes only a single sidecar 324 per hardware thread of the processor core 200, meaning that in this embodiment at most one PTESYNC request per thread can be active at a time.

Following block 1302, the process of FIG. 13 proceeds in parallel to block 1304 and blocks 1306-1312. Block 1304 represents the initiating processor core 200 performing the load ordering function of the PTESYNC request by waiting for all appropriate older load requests of all hardware threads (i.e., those that would be architecturally required by a HWSYNC to receive their requested data prior to completion of processing of the HWSYNC request) to drain from LMQ 306. By waiting for these load requests to be satisfied at block 1304, it is guaranteed that the set of load requests, if any, marked at block 906 will receive data from the correct memory page (even if the target address was on the memory page being reassigned) rather than a reassigned memory page.

In parallel with block 1304, processor core 200 also issues the PTESYNC request corresponding to PTESYNC instruction 410 to L1 STQ 304 (block 1306). The process proceeds from block 1306 to block 1308, which illustrates processor core 200 performing the store ordering function of the PTESYNC request by waiting until all appropriate older TSYNC requests and store requests of all hardware threads (i.e., those that would be architecturally required by a HWSYNC to have drained from L1 STQ 304) to drain from L1 STQ 304. Once the store ordering performed at block 1308 is complete, the PTESYNC request is issued from L1 STQ 304 to L2 STQ 320 via bus 318 as indicated at block 1310.

The process then proceeds from block 1310 to block 1312, which illustrates the initiating processor core 200 monitoring to detect receipt of a PTESYNC_ACK signal from the storage subsystem via bus 325 indicating that processing of the PTESYNC request by the initiating processor core 200 is complete. (Generation of the PTESYNC_ACK signal is described below with reference to block 1410 of FIG. 14.)

Only in response to affirmative determinations at both of blocks 1304 and 1312, the process of FIG. 13 proceeds to block 1314, which illustrates processor core 200 resuming dispatch of instructions in the initiating hardware thread; thus, release of the hardware thread at block 1314 allows processing of instructions following PTESYNC instruction 430 to begin. Thereafter, the process of FIG. 13 ends at block 1316.

Figure 14:
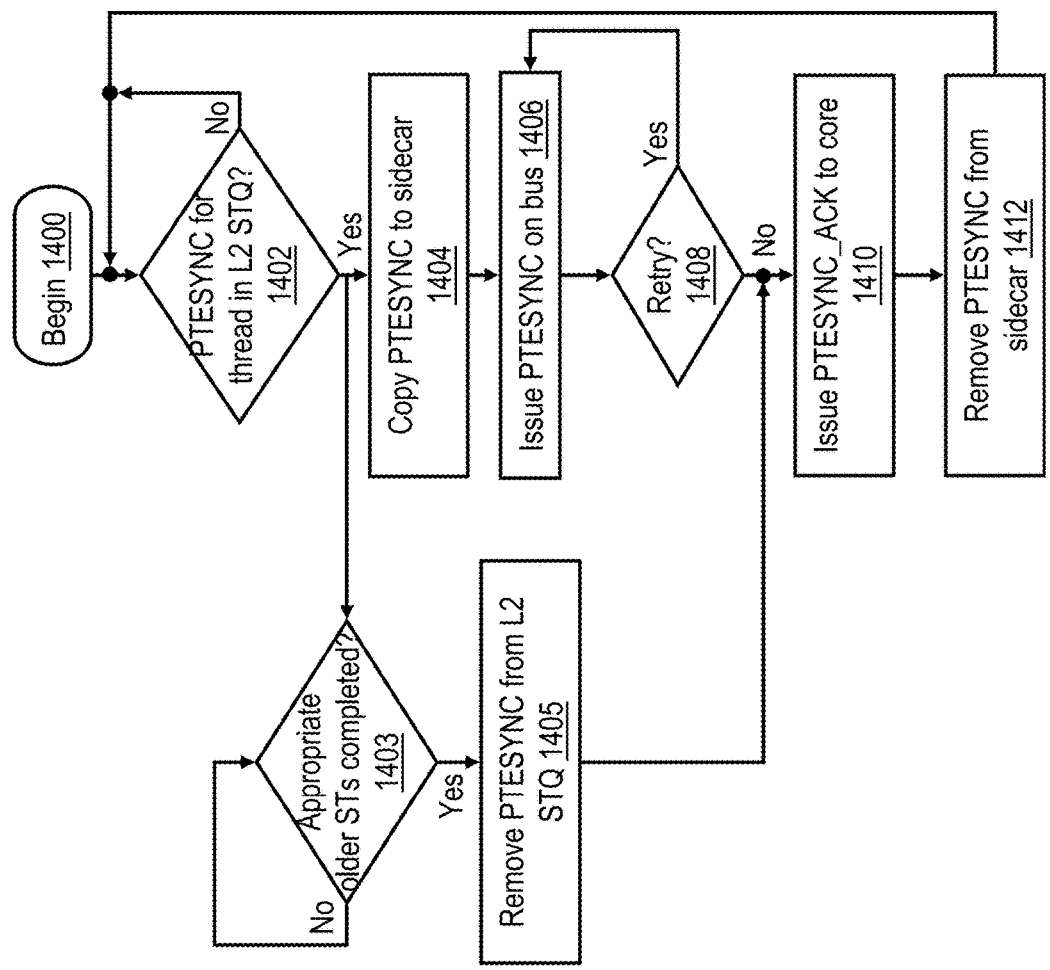
FIG. 14 is a high level logical flowchart of an exemplary method by which a processing unit processes a page table synchronization request in accordance with one embodiment.

Referring now to FIG. 14, there is depicted a high level logical flowchart of an exemplary method by which an L2 STQ 320 and its associated sidecar logic 322 of a processing unit 104 process a PTESYNC request in accordance with one embodiment. The process of FIG. 14 begins at block 1400 and then proceeds to block 1402, which depicts L2 STQ 320 monitoring for receipt of a PTESYNC request from L1 STQ 304, as described above with reference to block 1310 of FIG. 13. In response to receipt of the PTESYNC request, L2 STQ 320 and sidecar logic 324 cooperate to perform two functions, namely, (1) store ordering for store requests within L2 STQ 320 and (2) ensuring completion of the TSYNC request at all of the other processing cores 200. In the embodiment of FIG. 14, these two functions are performed in parallel along the two paths illustrated at blocks 1403, 1405 and blocks 1404, 1406 and 1408, respectively. In alternative embodiments, these functions could instead be serialized by first performing the ordering function illustrated at blocks 1403 and 1405 and then ensuring completion of the TSYNC request at blocks 1404, 1406, and 1408. (It should be noted that attempting to serialize the ordering of these function by ensuring completion of the PTESYNC request prior to performing store ordering can create a deadlock.)

Referring now to block 1403-1405, L2 STQ 320 performs store ordering for the PTESYNC request by ensuring that all appropriate older store requests within L2 STQ 320 have been drained from L2 STQ 320. The set of store requests that are ordered at block 1403 includes a first subset that may have had their target addresses translated by the translation entry invalidated by the earlier TLBIE request(s). This first subset corresponds to those marked at block 906. In addition, the set of store requests that are ordered at block 1403 includes a second subset that includes those architecturally defined store requests would be ordered by a HWSYNC. Once all such store requests have drained from L2 STQ 320, L2 STQ 320 removes the PTESYNC request from L2 STQ 320 (block 1405). Removal of the PTESYNC request allows store requests younger than the PTESYNC request to flow through L2 STQ 320, thus preventing deadlock.

Referring now to block 1404, sidecar logic 322 detects the presence of the PTESYNC request in L2 STQ 320 and copies the PTESYNC request to the appropriate sidecar 324 via interface 321 prior to removal of the PTESYNC request from L2 STQ 320 at block 1405. The process then proceeds to the loop illustrated at blocks 1406 and 1408 in which sidecar logic 322 continues to issue PTESYNC requests on system fabric 110, 114 until no processor core 200 responds with a Retry coherence response (i.e., until the preceding TLBIE request(s) of the same processor core and hardware thread have been completed by all snooping processor cores 200 as indicated by an alternative coherence response (e.g., Ack, Null, etc.)).

Only in response to completion of both of the functions depicted at blocks 1403, 1405 and blocks 1404, 1406 and 1408, the process proceeds to block 1410, which illustrates sidecar logic 322 issuing a PTESYNC_ACK signal to the affiliated processor core via bus 325, which is awaited by the issuing hardware thread at block 1312 of FIG. 13. Sidecar logic 322 then removes the PTESYNC request from the sidecar 324 (block 1412), and the process of FIG. 14 returns to block 1402, which has been described.

Figure 15:
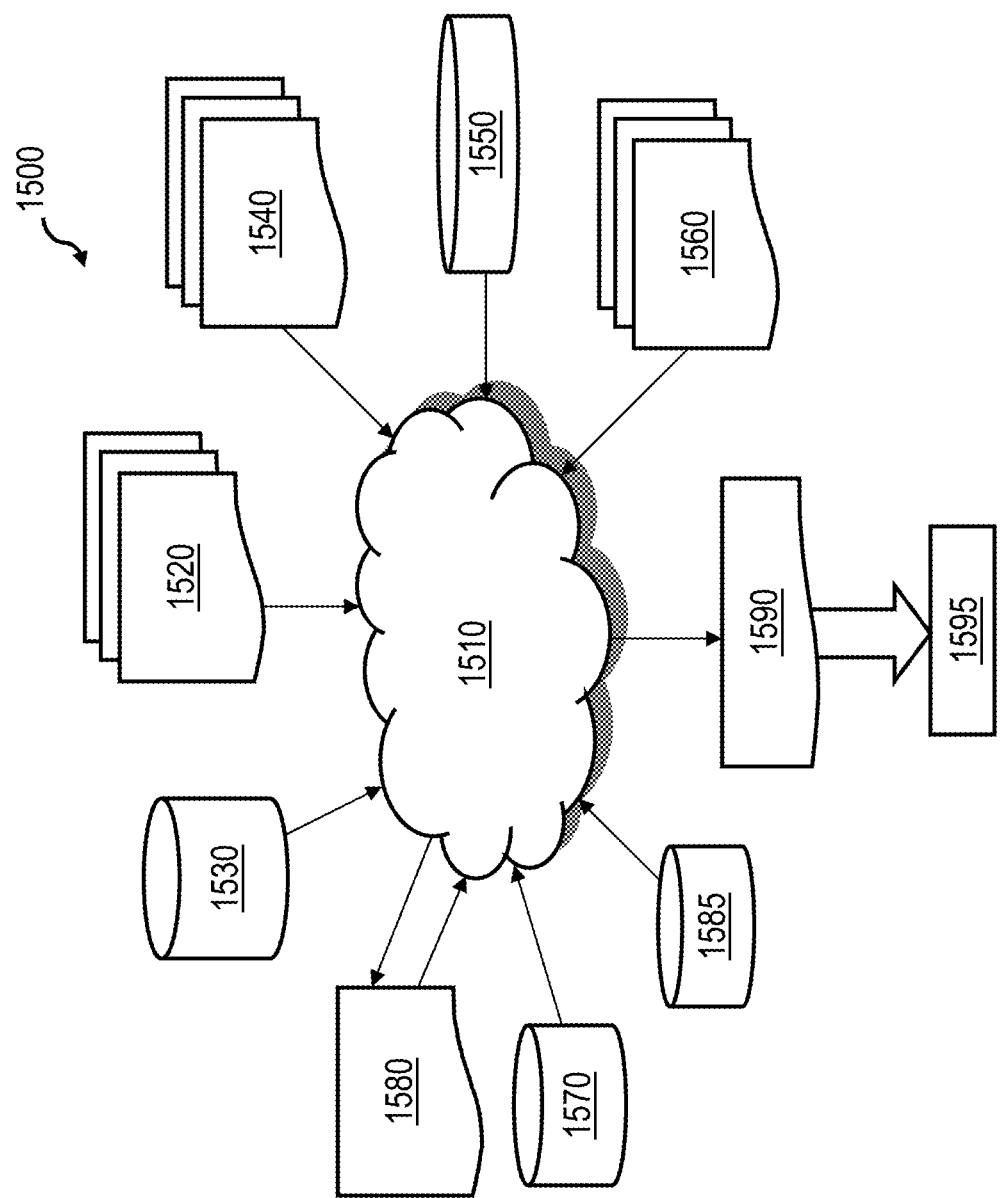
FIG. 15 is a data flow diagram illustrating a design process.

With reference now to FIG. 15, there is depicted a block diagram of an exemplary design flow 1500 used for example, in semiconductor IC logic design, simulation, test, layout, and manufacture. Design flow 1500 includes processes, machines and/or mechanisms for processing design structures or devices to generate logically or otherwise functionally equivalent representations of the design structures and/or devices described above and shown in FIGS. 1-3. The design structures processed and/or generated by design flow 1500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1500 may vary depending on the type of representation being designed. For example, a design flow 1500 for building an application specific IC (ASIC) may differ from a design flow 1500 for designing a standard component or from a design flow 1500 for instantiating the design into a programmable array, for example a programmable gate array (PGA) or a field programmable gate array (FPGA) offered by Altera® Inc. or Xilinx® Inc.

FIG. 15 illustrates multiple such design structures including an input design structure 1520 that is preferably processed by a design process 1516. Design structure 1520 may be a logical simulation design structure generated and processed by design process 1516 to produce a logically equivalent functional representation of a hardware device. Design structure 1520 may also or alternatively comprise data and/or program instructions that when processed by design process 1516, generate a functional representation of the physical structure of a hardware device. Whether representing functional and/or structural design features, design structure 1520 may be generated using electronic computer-aided design (ECAD) such as implemented by a core developer/designer. When encoded on a machine-readable data transmission, gate array, or storage medium, design structure 1520 may be accessed and processed by one or more hardware and/or software modules within design process 1516 to simulate or otherwise functionally represent an electronic component, circuit, electronic or logic module, apparatus, device, or system such as those shown in FIGS. 1-3. As such, design structure 1520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1516 preferably employs and incorporates hardware and/or software modules for synthesizing, translating, or otherwise processing a design/simulation functional equivalent of the components, circuits, devices, or logic structures shown in FIGS. 1-3 to generate a netlist 1580 which may contain design structures such as design structure 1520. Netlist 1580 may comprise, for example, compiled or otherwise processed data structures representing a list of wires, discrete components, logic gates, control circuits, I/O devices, models, etc. that describes the connections to other elements and circuits in an integrated circuit design. Netlist 1580 may be synthesized using an iterative process in which netlist 1580 is resynthesized one or more times depending on design specifications and parameters for the device. As with other design structure types described herein, netlist 1580 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1516 may include hardware and software modules for processing a variety of input data structure types including netlist 1580. Such data structure types may reside, for example, within library elements 1530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1540, characterization data 1550, verification data 1560, design rules 1570, and test data files 1585 which may include input test patterns, output test results, and other testing information. Design process 1516 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1516 without deviating from the scope and spirit of the invention. Design process 1516 may also include modules for performing standard circuit design processes such as timing analysis, verification, design rule checking, place and route operations, etc.

Design process 1516 employs and incorporates logic and physical design tools such as HDL compilers and simulation model build tools to process design structure 1520 together with some or all of the depicted supporting data structures along with any additional mechanical design or data (if applicable), to generate a second design structure 1590. Design structure 1590 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1520, design structure 1590 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 1590 may comprise a compiled, executable HDL simulation model that functionally simulates the devices shown in FIGS. 1-3.

Design structure 1590 may also employ a data format used for the exchange of layout data of integrated circuits and/or symbolic data format (e.g., information stored in a GDSII (GDS2), GL1, OASIS, map files, or any other suitable format for storing such design data structures). Design structure 1590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3. Design structure 1590 may then proceed to a stage 1595 where, for example, design structure 1590: proceeds to tape-out, is released to manufacturing, is released to a mask house, is sent to another design house, is sent back to the customer, etc.

As has been described, in at least one embodiment, a multiprocessor data processing system includes a processor core having a translation structure for buffering a plurality of translation entries. The processor core receives a sequence of a plurality of translation invalidation requests. In response to receipt of each of the plurality of translation invalidation requests, the processor core determines that each of the plurality of translation invalidation requests indicates that it does not require draining of memory referent instructions for which address translation has been performed by reference to a respective one of a plurality of translation entries to be invalidated. Based on the determination, the processor core invalidates the plurality of translation entries in the translation structure without regard to draining from the processor core of memory access requests for which address translation was performed by reference to the plurality of translation entries.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of invalidating translation entries in a multiprocessor data processing system including a processor core having at least one queue for buffering memory access requests and a translation structure for buffering a plurality of translation entries, the method comprising:
the processor core receiving a sequence of a plurality of translation invalidation requests;
in response to receipt of each of the plurality of translation invalidation requests, the processor core determining that said each of the plurality of translation invalidation requests indicates that said each of the plurality of translation invalidation requests does not require draining, from the at least one queue, of one or more memory access requests for which address translation has been performed by reference to a respective one of a plurality of translation entries to be invalidated; and
based on the determining, the processor core invalidating the plurality of translation entries in the translation structure without regard to presence of the one or more memory access request in the at least one queue and draining of the one or more memory access requests from the at least one queue.

2. The method of claim 1, wherein:
the processor core is a first processor core of the multiprocessor data processing system including a plurality of processor cores coupled by a system fabric;
the method further comprises generating each of the plurality of translation invalidation requests by:
executing in one of the plurality of processor cores a translation entry invalidation instruction that commands invalidation of one of the plurality of translation entries, wherein the translation entry invalidation instruction includes a field providing an indication that no draining is required for memory access requests for which address translation was performed by reference to said one of the plurality of translation entries;
in response to executing the translation entry invalidation instruction and based on the indication provided by the field, said one of the plurality of processor cores issuing the translation invalidation request on the system fabric.

3. The method of claim 2, wherein the executing includes executing the translation entry invalidation instruction in an instruction sequence that updates memory attributes of said one of the plurality of translation entries.

4. The method of claim 2, wherein the executing includes:
the one of the plurality of processor cores executing the translation entry invalidation instruction without pausing dispatch of instructions within an initiating hardware thread including the translation entry invalidation instruction.

5. The method of claim 1, and further comprising:
the processor core refraining from marking memory access requests for which address translation was performed by reference to the plurality of translation entries.

6. The method of claim 1, wherein the receiving comprises the processor core receiving the plurality of translation invalidation requests in a plurality of broadcasts on a system fabric of the multiprocessor data processing system.

7. A processing unit for a multiprocessor data processing system, the processing unit comprising:
a processor core including:
an execution unit that executes instructions;
at least one queue for buffering memory access requests;
a translation structure for buffering a plurality of translation entries;
a translation sequencer configured to perform:
receiving a sequence of a plurality of translation invalidation requests;
in response to receipt of each of the plurality of translation invalidation requests, determining that said each of the plurality of translation invalidation requests indicates that said each of the plurality of translation invalidation requests does not require draining, from the at least one queue, of one or more memory access requests for which address translation has been performed by reference to a respective one of a plurality of translation entries to be invalidated; and
based on the determining, invalidating the plurality of translation entries in the translation structure without regard to presence of the one or more memory access request in the at least one queue and draining of the one or more memory access requests from the at least one queue.

8. A data processing system including a plurality of processing units according to claim 7 and a system fabric coupling the plurality of processing units.

9. The data processing system of claim 8, wherein:
the plurality of processing units are configured to generate the plurality of translation invalidation requests by:
executing in one of a plurality of processor cores a translation entry invalidation instruction that commands invalidation of one of the plurality of translation entries, wherein the translation entry invalidation instruction includes a field providing an indication that no draining is required for memory access requests for which address translation was performed by reference to said one of the plurality of translation entries;
in response to executing the translation entry invalidation instruction and based on the indication provided by the field, issuing the translation invalidation request on the system fabric.

10. The data processing system of claim 9, wherein the executing includes executing the translation entry invalidation instruction in an instruction sequence that updates memory attributes of said one of the plurality of translation entries.

11. The data processing system of claim 9, wherein the executing includes:
the one of the plurality of processor cores executing the translation entry invalidation instruction without pausing dispatch of instructions within an initiating hardware thread including the translation entry invalidation instruction.

12. The processing unit of claim 7, wherein the processor core is configured to refrain from marking memory access requests for which address translation was performed by reference to the plurality of translation entries.

13. The processing unit of claim 7, wherein the processor core receives the plurality of translation invalidation requests in a plurality of broadcasts on a system fabric of the multiprocessor data processing system.

14. A design structure tangibly embodied in a machine-readable storage device for designing, manufacturing, or testing an integrated circuit, the design structure comprising:
- a processing unit for a multiprocessor data processing system, the processing unit including:
- a processor core including:
    - an execution unit that executes instructions;
    - at least one queue for buffering memory access requests;
    - a translation structure for buffering a plurality of translation entries;
    - a translation sequencer configured to perform:
        - receiving a sequence of a plurality of translation invalidation requests;
        - in response to receipt of each of the plurality of translation invalidation requests, determining that said each of the plurality of translation invalidation requests indicates that said each of the plurality of translation invalidation requests does not require draining, from the at least one queue, of one or more memory access requests for which address translation has been performed by reference to a respective one of a plurality of translation entries to be invalidated; and
        - based on the determining, the processor core invalidating the plurality of translation entries in the translation structure without regard to presence of the one or more memory access request in the at least one queue and draining of the one or more memory access requests from the at least one queue.

15. The design structure of claim 13, wherein:
the processing unit is configured to generate the plurality of translation invalidation requests by:
- executing a translation entry invalidation instruction that commands invalidation of one of the plurality of translation entries, wherein the translation entry invalidation instruction includes a field providing an indication that no draining is required for memory access requests for which address translation was performed by reference to said one of the plurality of translation entries;
- in response to executing the translation entry invalidation instruction and based on the indication provided by the field, issuing the translation invalidation request on the system fabric.

16. The design structure of claim 14, wherein the executing includes executing the translation entry invalidation instruction in an instruction sequence that updates memory attributes of said one of the plurality of translation entries.

17. The design structure of claim 14, wherein the executing includes executing the translation entry invalidation instruction without pausing dispatch of instructions within an initiating hardware thread including the translation entry invalidation instruction.

18. The design structure of claim 13, wherein the processor core is configured to refrain from marking memory access requests for which address translation was performed by reference to the plurality of translation entries.

19. The design structure of claim 13, wherein the processor core receives the plurality of translation invalidation requests in a plurality of broadcasts on a system fabric of the multiprocessor data processing system.

* * * * *